US008001353B2

(12) United States Patent
Mather et al.

(10) Patent No.: US 8,001,353 B2
(45) Date of Patent: Aug. 16, 2011

(54) APPARATUS AND METHOD FOR CONFIGURING MEMORY BLOCKS

(75) Inventors: Clifford J. Mather, Fort Collins, CO (US); Jyh Chan Wu, Fort Collins, CO (US); Michael E. Yoder, Fort Collins, CO (US); Murthy V. Mamidi, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 11/150,664

(22) Filed: Jun. 10, 2005

(65) Prior Publication Data

US 2006/0282635 A1   Dec. 14, 2006

(51) Int. Cl.
*G06F 13/00* (2006.01)
(52) U.S. Cl. .......... 711/170; 711/154; 711/159; 360/48
(58) Field of Classification Search .................. 711/170, 711/154, 159; 360/48
See application file for complete search history.

(56) References Cited

U.S. PATENT DOCUMENTS

| 5,592,342 | A  | * | 1/1997 | Hall et al. ..................... 360/48 |
| 6,212,611 | B1 | * | 4/2001 | Nizar et al. .................. 711/169 |
| 7,225,313 | B2 | * | 5/2007 | Mather et al. ................ 711/170 |
| 2003/0200402 | A1 | * | 10/2003 | Willman et al. ............. 711/154 |
| 2005/0086442 | A1 | * | 4/2005 | McBrearty et al. .......... 711/159 |
| 2005/0198492 | A1 | * | 9/2005 | Gaur et al. ................... 713/153 |
| 2005/0198498 | A1 | * | 9/2005 | Gaur et al. ................... 713/160 |
| 2006/0179236 | A1 | * | 8/2006 | Shafi ............................ 711/137 |

* cited by examiner

*Primary Examiner* — Yong Choe

(57) ABSTRACT

An exemplary embodiment of the invention includes methods of configuring a memory block including: providing a memory block, the memory block having a set of addressable memory locations; configuring the memory block to include a plurality of pages corresponding to the set of addressable memory locations, the plurality of pages each having a page size; and allocating at least one of the plurality of pages for storing at least one per-page data structure, the at least one per-page data structure co-located with the memory block. In some embodiments, methods further include: defining the set of addressable memory locations; and computing a number of pages needed to store the at least one per-page data structure. Advantages of the invention include flexible memory allocation. The invention supports a dynamic update of the memory per-page data structures so that the operating system can take full advantage of the available memory.

17 Claims, 3 Drawing Sheets

APPARATUS AND METHOD FOR CONFIGURING MEMORY BLOCKS

BACKGROUND

As computer processing and related technologies continue to evolve, memory and storage requirements continue to increase. Where once a few thousand bytes of memory could sufficiently handle an operating system and related processes, now many gigabytes of memory may be required in some complex processing systems. Furthermore, in some systems, the addition of memory may also be accompanied by additional processors and processor related hardware. As such, the complexity of these systems requires efficient and flexible memory configuration schemes.

Conventional computer systems manage memory in terms of blocks. Memory blocks are generally divided into a number of pages in accordance with operating system parameters. Page sizes are typically selected in $2^n$ byte increments. At least some pages may be configured as per-page data structures (PPDS) that contain information related to configured memory blocks (e.g. pages). Conventional per-page data structures are centrally located in one or more memory blocks and generally occupy approximately 5%-10% of the total available memory when configured. Due to the centralization of per-page data structures, memory blocks may not be physically co-located with their corresponding per-page data structures.

Two general schemes under which memory may be configured are uniform memory access (UMA) and non-uniform memory access (NUMA). Under a UMA scheme, memory blocks are treated as logically contiguous even though the memory blocks may not actually be physically contiguous. As noted above, this scheme allows for programming efficiencies. However, UMA does not distinguish physical proximity of a memory block with a process or processor utilizing that memory block.

NUMA, on the other hand, does account for physical proximity. Under NUMA, some processing efficiencies may be achieved by configuring a memory block such that the memory block is physically proximate with a process or processor utilizing that memory block. In this manner, processing efficiencies may be achieved over UMA configurations. However, at least one disadvantage of current schemes is that per-page data structures for a given memory system are centrally located. Thus, despite accounting for physical proximity of a memory block with a process or processor utilizing that memory block, some associated memory elements may remain physically remote.

Another disadvantage to centrally locating per-page data structures is that when a memory block is removed, a corresponding per-page data structure is not easily recovered for general memory use and, in some examples, may be entirely unavailable for any further memory use until a reboot occurs.

SUMMARY

The invention provides apparatus and methods for configuring memory blocks. An exemplary embodiment of the invention is a method of configuring a memory block comprising: providing a memory block, the memory block having a set of addressable memory locations; configuring the memory block to include a plurality of pages corresponding to the set of addressable memory locations, the plurality of pages each having a page size; and allocating at least one of the plurality of pages for storing at least one per-page data structure (PPDS), the at least one per-page data structure co-located with the memory block.

Advantages of the invention include flexible memory allocation that permits systems administrators to modify memory blocks when desired. The invention supports a dynamic update of the memory per-page data structures so that the operating system can take full advantage of available memory.

DRAWINGS

The present invention is illustrated by way of example, and not by way of limitation, in the figures of the accompanying drawings and in which like reference numerals refer to similar elements and in which.

DETAILED DESCRIPTION

The present invention is described in detail with reference to exemplary embodiments thereof as illustrated in the accompanying drawings. In the following description, numerous specific details are set forth in order to provide a description of the best mode of the invention. It will be apparent, however, to one skilled in the art, that the present invention may be practiced without some or all of these specific details.

Various embodiments are described herein, including apparatus, methods and techniques for performing the invention. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of tangible, physical computer readable media that stably store computer instructions and other information, such as an electrical memory a hard disk, or an optical disk, but computer readable media do not include electromagnetic radiation, electrical currents, or rapidly oscillating fields. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1A:
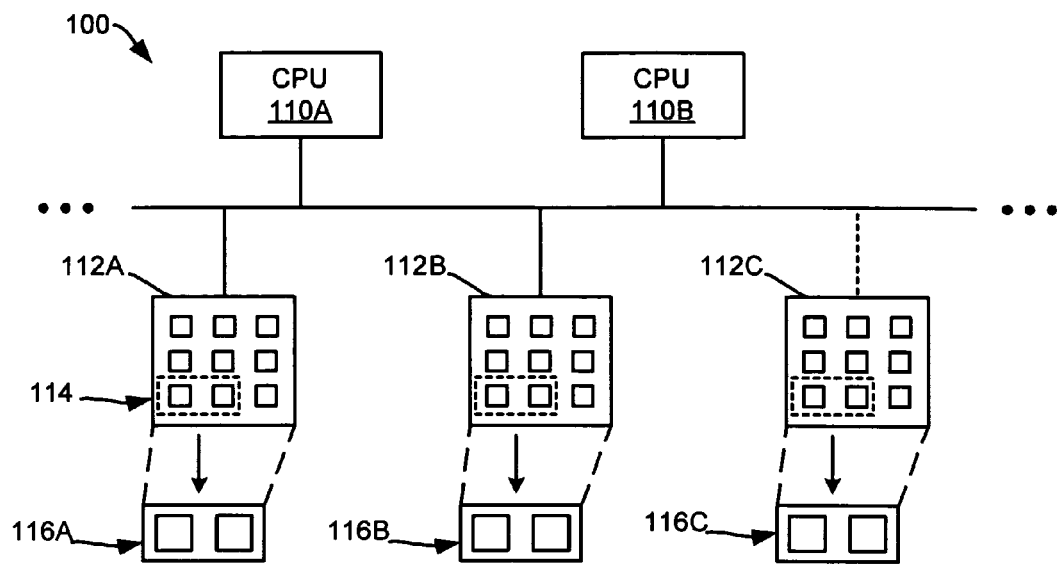
FIGS. 1A-1B are diagrammatic illustrations of a memory system in accordance with an embodiment of the present invention.
Figure 1B:
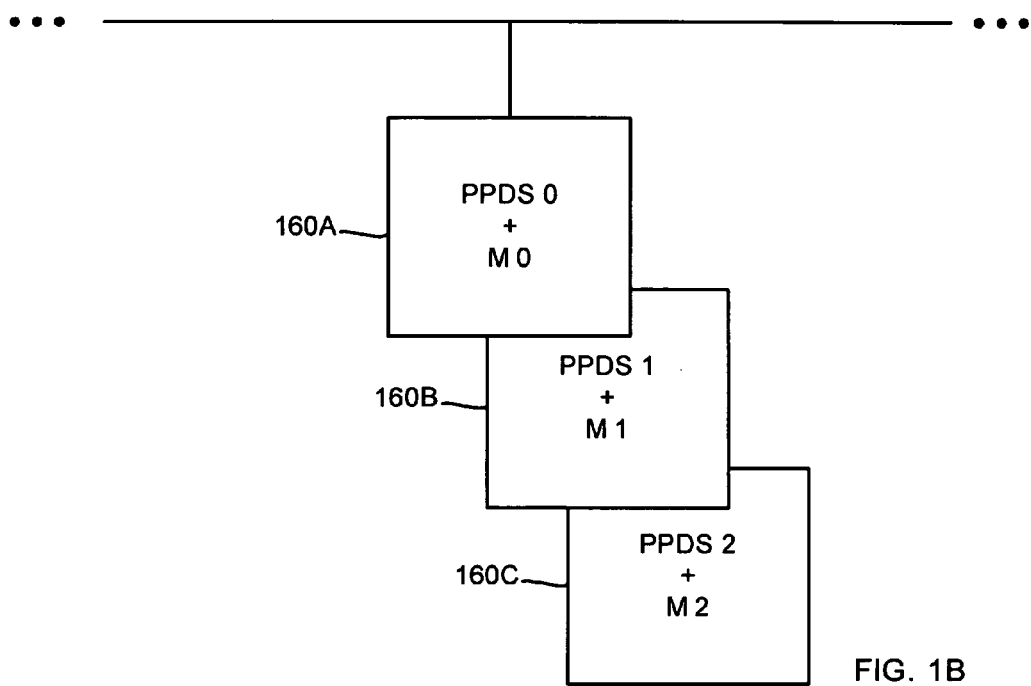

Turning to FIGS. 1A-1B, these figures present diagrammatic illustrations of a memory system in accordance with an embodiment of the present invention. In particular, for FIG. 1A, a memory system 100 is illustrated. Memory system 100 may include any number of CPU's 110A-110B and any number of memory blocks 112A-112C. In some embodiments, a single CPU may be utilized. In other embodiments, many CPU's may be utilized. Thus, the number of CPU's and memory blocks illustrated are not intended to be limiting as can be appreciated by one skilled in the art. Each memory block 112A-112C may represent a block of physical memory. In one embodiment, a portion of memory block 112A may be configured as a page 114. A page, as noted above, is a fixed amount of data based on factors such as operating systems preferences. Page sizes may be typically selected in $2^n$ bytes increments. In some embodiments, a selected page size may be at least 4096 bytes. At least some of the pages (i.e. 114) may be configured as per-page data structures (PPDS) 116A-116C. In the illustrated embodiment, memory blocks 112A-112C may be configured with a number of per-page data structures 116A-116C that may be physically co-located on their corresponding memory block. Thus, memory block 112A may contain per-page data structure 116A; memory block 112B may contain per-page data structure 116B; and memory block 112C may contain per-page data structure 116C.

This physical topology may be further illustrated in FIG. 1B. As illustrated, memory block 160A contains a number of per-page data structures (PPDS 0) and a number of co-located pages of physical memory (M 0). Likewise, memory blocks 160B and 160C contain per-page data structures (i.e. PPDS 1 and PPDS 2) and a number of co-located pages of physical memory (i.e. M1 and M2).

Logically, memory blocks may be handled as a contiguous block of memory. However, co-location of per-page data structures with their corresponding memory block provides at least two significant advantages. First, per-page data structures in co-located memory provide improved memory usage efficiency, which results in less wasted memory space compared to conventional systems. For example, in a conventional system, when memory is released from a system, a corresponding per-page data structure may be orphaned. The orphaned memory cannot typically be recycled for general memory use without, for example, a reboot. However, in present embodiments, a portion of released memory carrying its own per-page data structures does not result in orphaned memory because the per-page data structures are released along with the memory being released. Thus, when memory is dynamically added or removed, orphaned memory associated with per-page data structures may be avoided. Second, because per-page data structures are co-located with their corresponding memory block, memory access speed may realize significant efficiencies. As noted above, under a NUMA scheme, memory may be allocated such that physical proximity is accounted for. As such, the invention as set forth in the exemplary embodiments may realize advantages over conventional systems.

Figure 2:
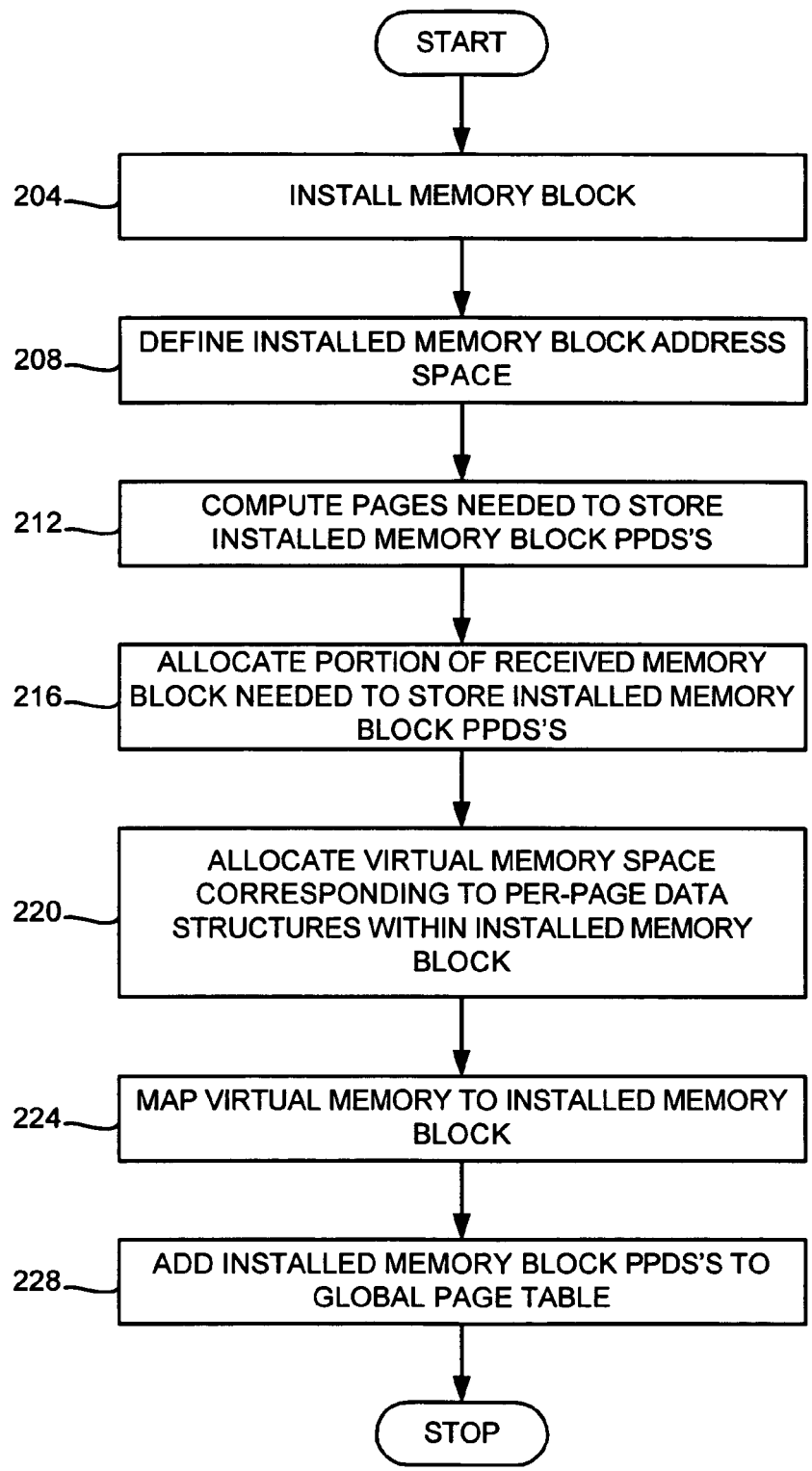
FIG. 2 is a diagrammatic flowchart of a method of configuring a memory module in accordance with an embodiment of the present invention.

FIG. 2 depicts a flowchart showing a method of configuring a memory block in accordance with an embodiment of the present invention. The flowchart makes reference to installing a memory block, but the invention is equally applicable to modification and/or removal of memory blocks that would then be addressed at restart of the memory management system or reboot of the computer system. At a first step 204, a new memory block is installed. As noted above, embodiments of the invention may be utilized at various states of a system. Thus, a memory block may be installed, for example, at restart, at reboot, or at runtime (i.e. dynamically) as required by a user. In some embodiments, the installed memory block may be part of a dedicated memory card. In other embodiments, the installed memory may be part of or integral to a functional card having a processor. At a next step 208, the method defines a memory block address space. That is, a memory range having a start and an end may be defined. In this manner, the method determines the amount of memory being added to a system.

At a next step 212, the method computes a number of pages need to store the memory block per-page data structures. As noted above, per-page data structures typically use approximately 5%-10% of the total amount of available memory block when configured depending on particular operating system implementations. In general, per-page data structures contain information corresponding to a memory block. In some embodiments, a per-page data structure may include: a memory state flag; a memory size flag; a memory location flag; and a memory type flag. In some embodiments memory state flags may include: whether a page is free; whether a page has a useful file system; and how many objects are sharing a page. In some embodiments, a memory type flag may include: whether a page is kernel memory; whether a page is virtual memory; and whether a page is explicitly allocated memory.

In prior art systems, allocating a proper amount of available memory to per-page data structures may require a user to anticipate whether or not memory may be added in the future since all per-page data structures may be configured at boot. Thus, a typical system may configure additional anticipated per-page data structures to accommodate anticipated, but not yet added memory. In present embodiments of the present invention, per-page data structures may be configured such that per-page data structures are co-located with a corresponding physical memory block. As such, no additional anticipated per-page data structures are required to accommodate anticipated, but not yet added memory. Thus, co-locating per-page data structures with corresponding memory blocks may allow for more efficient use of memory resources.

At a next step 216, the method allocates a portion of the installed memory block needed to store installed memory block per-page data structures. As noted above, co-locating per-page data structures with corresponding memory blocks allows for more efficient use of memory resources. At a next step 220, virtual memory space may be allocated corresponding to the per-page data structures with an installed memory block. As can be appreciated, virtual memory space is used by processes to store instructions and data. Virtual memory space is generally well-known in the art. Once virtual memory space has been allocated, the method maps the virtual memory to the installed memory block at a step 224 so that the installed memory may be used by the system. At a next step 228, the installed memory block per-page data structures may be added to a global page table. In this manner, the system may keep track and utilize the installed memory block space.

Exemplary embodiments of the invention have been described. In some embodiments, methods further include: defining the set of addressable memory locations; and computing a number of pages needed to store the at least one per-page data structure. In some embodiments, methods further include: allocating a range of system virtual memory corresponding to the memory block; mapping the range of system virtual memory to the memory block; and adding the per-page data structures to a table.

In other embodiments, tools for configuring a memory block are presented including: a configuration component for configuring the memory block to include a plurality of pages corresponding to a set of addressable memory locations, the plurality of pages each having a page size; and an allocation component for allocating at least one of the plurality of pages for storing at least one per-page data structure, the at least one per-page data structure co-located with the memory block. In some embodiments, tools further include: a definition component for defining the set of addressable memory locations; and a computational component for computing a number of pages needed to store the at least one per-page data structure. In some embodiments, tools further include: a virtual memory allocation component for allocating a range of system virtual memory corresponding to the memory block; a mapping component for mapping the range of system virtual memory to the memory block; and a table component for adding the per-page data structures to a table.

In other embodiments, a memory block is presented including: a set of addressable memory locations configured to include a plurality of pages; at least one per-page data structure stored in at least one of the plurality of pages, the at least one per-page data structure co-located with the memory block. In some embodiments, the memory block is dynamically configurable. In some embodiments, the memory block further includes a processor.

Figure 3:
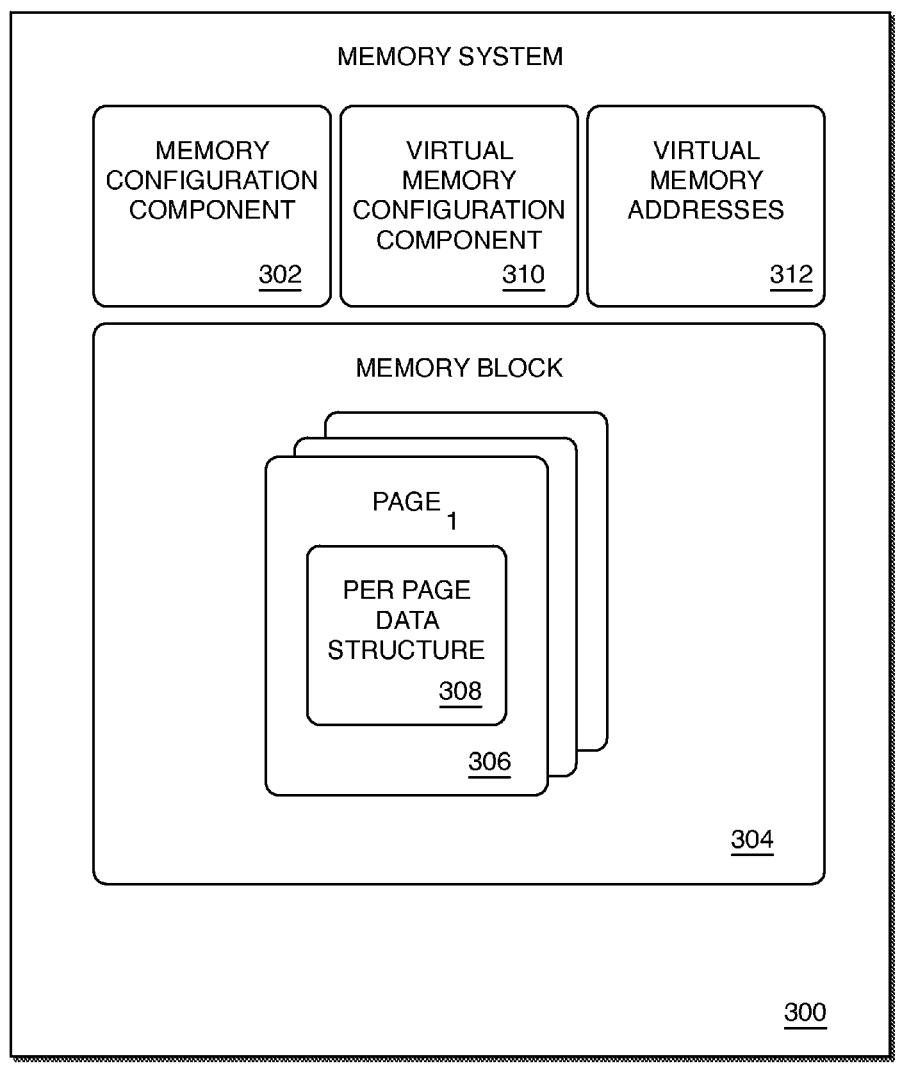
FIG. 3 is a diagrammatic illustration of a memory system in accordance with an embodiment of the present invention.

In other embodiments (e.g., as depicted in FIG. 3), memory systems (e.g., a memory system 300) are presented including: a memory configuration component 302; a memory block 304, the memory block configured as a plurality of pages 306 wherein at least some of the plurality of pages are configured to include at least one per-page data structure 308, the at least one per-page data structure co-located with the memory block; a virtual memory configuration component 310; and a block of virtual memory addresses 312 corresponding to the block of contiguous physical memory. In some embodiments, the memory configuration component 302 is configured to dynamically configure memory.

In other embodiments, a computer program product for use in conjunction with a computer system for configuring a memory block is presented, the computer program product comprising a computer readable storage medium and a computer program mechanism embedded therein, the computer program mechanism including: instructions for providing a memory block, the memory block having a set of addressable memory locations; instructions for configuring the memory block to include a plurality of pages corresponding to the set of addressable memory locations, the plurality of pages each having a page size; and instructions for allocating at least one of the plurality of pages for storing at least one per-page data structure, the at least one per-page data structure co-located with the memory block. In some embodiments, the computer program further includes: instructions for defining the set of addressable memory locations; and instructions for computing a number of pages needed to store the at least one per-page data structure. In some embodiments, the computer program product further includes: instructions for allocating a range of system virtual memory corresponding to the memory block; instructions for mapping the range of system virtual memory to the memory block; and instructions for adding the per-page data structures to a table.

Advantages of the invention include flexible memory allocation that permits systems administrators to modify memory blocks when desired. The invention supports a dynamic update of the memory per-page data structures so that the operating system can take full advantage of available memory.

While this invention has been described in terms of several embodiments and the best mode, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of configuring a memory block comprising:
   dynamically adding at least one memory block to a memory system comprising at least one other memory block;
   configuring the dynamically added memory block to comprise a plurality of pages corresponding to a set of addressable memory locations of the dynamically added memory block, the plurality of pages each having a page size; and
   allocating at least one page of the plurality of pages of the dynamically added memory block for storing at least one per-page data structure, the at least one per-page data structure co-located with the corresponding plurality of pages of the dynamically added memory block and comprising information related to the dynamically added memory block.

2. The method of claim 1 further comprising:
   defining the set of addressable memory locations; and
   computing a number of pages needed to store the at least one per-page data structure.

3. The method of claim 1 further comprising:
   allocating a range of system virtual memory corresponding to the memory block;
   mapping the range of system virtual memory to the memory block; and
   adding the per-page data structures to a table.

4. The method of claim 3 wherein the table is a global page table.

5. The method of claim 1 wherein the at least one per-page data structures comprises:
   a memory state condition flag;
   a memory size flag;
   a memory location flag; and
   a memory type flag.

6. The method of claim 1 wherein the dynamically added memory block is dynamically removed.

7. The method of claim 1 wherein the page size is at least 4096 bits.

8. A tool for configuring a memory block comprising a set of instructions stably stored in a computer-readable medium and executed by a computer processor, the set of instructions comprising:
   a configuration component for configuring each of more than one dynamically added memory blocks to each comprise a plurality of pages corresponding to a set of addressable memory locations of each memory block, the plurality of pages each having a page size; and
   an allocation component for allocating at least one of the plurality of pages for storing at least one per-page data structure, the at least one per-page data structure co-located with the corresponding plurality of pages of the one of each dynamically added memory block.

9. The tool of claim 8 further comprising:
   a definition component for defining the set of addressable memory locations; and
   a computational component for computing a number of pages needed to store the at least one per-page data structure.

10. The tool of claim 8 further comprising:
    a virtual memory allocation component for allocating a range of system virtual memory corresponding to the memory block;
    a mapping component for mapping the range of system virtual memory to the memory block; and
    a table component for adding the per-page data structures to a table.

11. The tool of claim 10 wherein the table is a global page table.

12. The tool of claim 8 wherein the at least one per-page data structures comprises:
a memory state condition flag;
a memory size flag;
a memory location flag; and
a memory type flag.

13. The tool of claim 8 wherein the configuration component dynamically configures the memory block.

14. The tool of claim 8 wherein the page size is at least 4096 bits.

15. A memory system comprising:
a memory configuration component;
more than one dynamically added memory blocks, each of the more than one dynamically added memory blocks configured as a plurality of pages wherein at least some of the plurality of pages of each memory block are configured to include at least one per-page data structure, the at least one per-page data structure co-located with the corresponding plurality of pages of one of the dynamically added memory block;
a virtual memory configuration component; and
a block of virtual memory addresses corresponding to the block of contiguous physical memory.

16. The memory system of claim 15 wherein the memory configuration component is configured to dynamically configure the more than one dynamically added memory blocks.

17. The memory block of claim 15 wherein the at least one per-page data structures comprises:
a memory state condition flag; a memory size flag;
a memory location flag; and
a memory type flag.

* * * * *